(No Model.) 2 Sheets—Sheet 2.
L. G. ABBOTT & J. P. MOODY.
LOCKING DEVICE FOR SWINGING SASH WINDOWS.
No. 552,950. Patented Jan. 14, 1896.
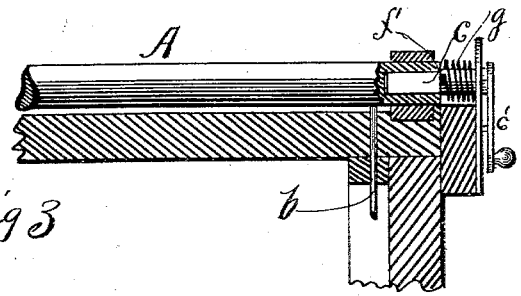
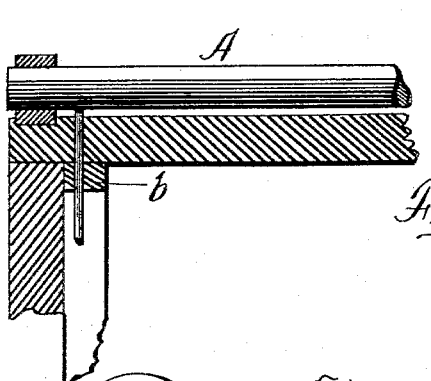
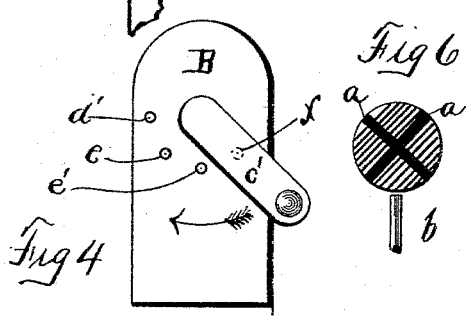
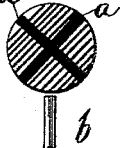 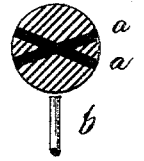 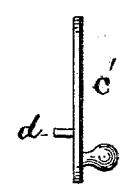
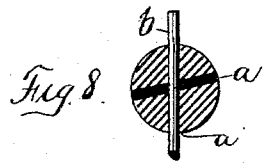 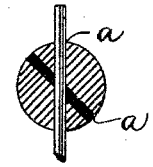
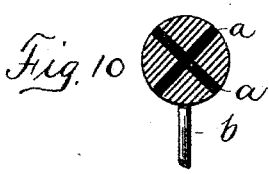 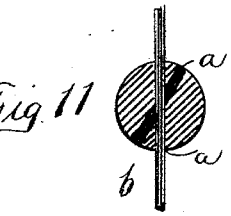
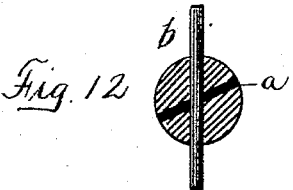 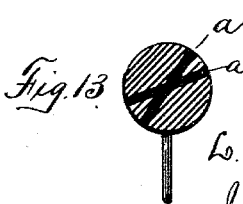
WITNESSES:
Charles N. Morris.
Jessie P. Murray
INVENTORS
L. G. Abbott and
J. P. Moody.
BY
Smith & Denison
ATTORNEYS.

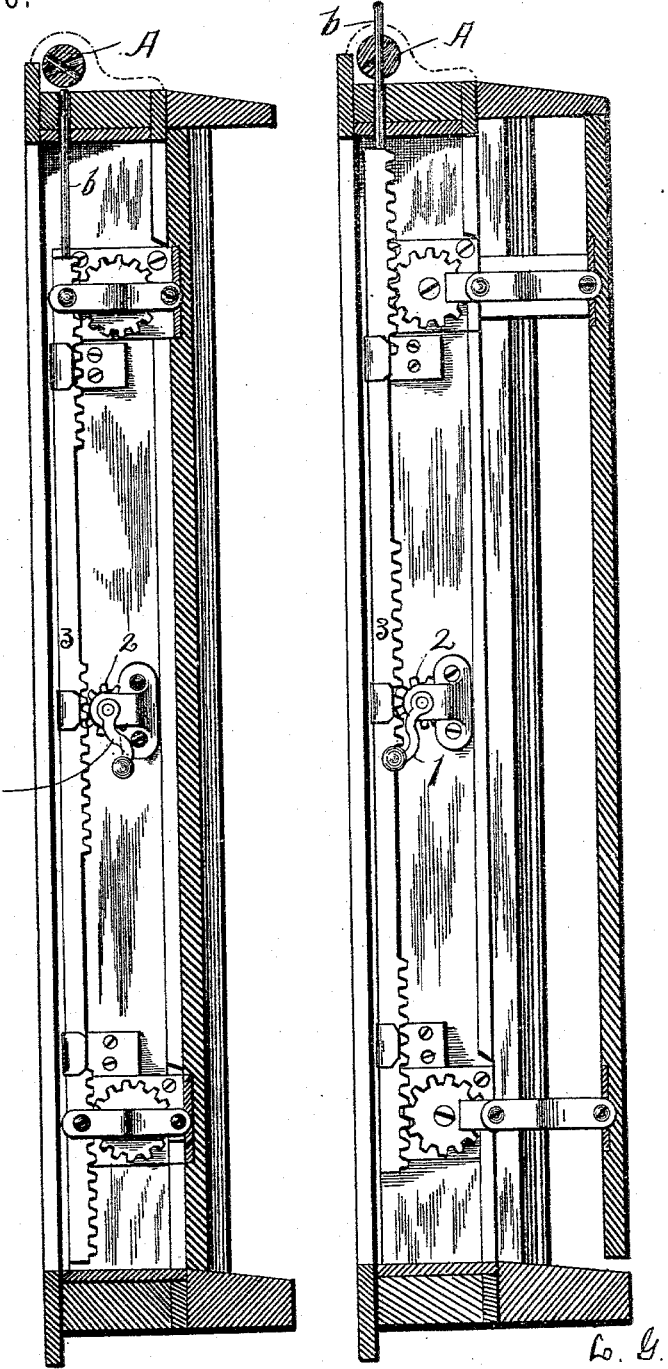

United States Patent Office.

LEONARD G. ABBOTT AND JOSEPH P. MOODY, OF SYRACUSE, NEW YORK.

LOCKING DEVICE FOR SWINGING-SASH WINDOWS.

SPECIFICATION forming part of Letters Patent No. 552,950, dated January 14, 1896.

Application filed September 26, 1895. Serial No. 563,686. (No model.)

*To all whom it may concern:*

Be it known that we, LEONARD G. ABBOTT and JOSEPH P. MOODY, of Syracuse, in the county of Onondaga, in the State of New York, have invented new and useful Improvements in Locking Devices for Swinging-Sash Windows, of which the following, taken in connection with the accompanying drawings, is a full, clear, and exact description.

This invention relates to improvements in swinging-sash windows, and is more especially an improvement upon the swinging-sash windows shown, illustrated, and described in Letters Patent granted to Abbott and Greene under date of December 18, 1894, No. 531,244.

We have found by experience and practice that the window illustrated in said Letters Patent is open to the objection that it can be opened on either side by a passenger and that ofttimes it is opened out the forward side, so that the motion of the car draws into it a large amount of smoke, dust, and cinders to the discomfiture of the occupants, whereas the spirit and intent of the window is that it shall be opened out rearwardly, so as to produce a suction to draw out the foul atmosphere, and to that end the trainman shall have complete control over the side of the window which shall be open and effectually lock the other side so that a passenger cannot open it.

Our object is to produce such a swinging-sash window, so arranging and adapting it that it can be opened at but one side at a time by the passenger—or, in other words, putting the side which shall be free to open completely under the control of the passenger and not allow the forward side to be opened by the occupant of the car.

Our invention consists in the several new and novel features of construction and combination of parts hereinafter described, and which are specifically set forth in the claims hereunto annexed.

It is constructed as follows, reference being had to the accompanying drawings, in which—

Figure 1 is a vertical sectional elevation through one side of the window, showing the parts which operate to throw the sash to and fro showing the sash closed. Fig. 2 is a similar view showing one edge of the sash open. Fig. 3 is a longitudinal view of the frame in which the sash is mounted, showing the locking-roller at the top, which is adapted to extend the entire length of the coach over the windows, and means at one end for operating them. Fig. 4 is an end view of Fig. 3 upon which the operating device is located. Fig. 5 is an edge view of the crank-arm which operates the roller. Figs. 6, 7, 8, 9, 10, 11, 12, and 13 are cross-sections of the locking-roller, showing the position of the perforation in its various positions.

Similar letters and figures of reference indicate corresponding parts.

Inasmuch as this application is simply an improvement upon the Letters Patent above referred to and to be adapted to the construction therein shown it will not be necessary to describe the operation of the swinging window, as it has been fully and completely described in said Letters Patent, other than to say that the sash is opened by turning the crank 1, which operates the drive-gear 2, and this in turn engages with the rack-bar 3, so that whenever the side of the window is swung open the rack-bar 3 is raised and lowered as it is closed.

Above the sash of the window and extending the entire length of the coach is a locking-roller A suitably mounted and provided with transverse openings $a$ opposite or in line with the pin $b$, which is secured to the upper end of the rack-bar 3, these openings $a$ being arranged as will more fully hereinafter appear to adapt themselves to the work in hand.

In one end of the locking-roller A is removably mounted a pin or shank $c$, having a crank-arm $c'$ upon its outer end, said crank-arm having an inwardly-extending lug or pin $d$.

B is a plate through which the pin C passes and is provided with openings $d'$ $e$ $e'$ $f$, adapted to receive the pin $d$. Upon the pin C, and between the plate B and the lug $f'$, is a spiral spring $g$ for the purpose of producing a tension upon the pin $c$, crank-arm $c'$, so as to force the pin $d$ into the openings $d'$, $e$, $e'$, and $f$ when the crank-arm $c'$ is turned so as to bring the pin $d$ into alignment with said openings.

Our invention is operated as follows: When the crank-arm $c'$ occupies the position shown in Fig. 4—that is, the pin $d$ is in the aperture $f$—the locking-roller A is in such position so that the apertures $a$ at both ends are out of alignment with the pin $b$, as shown in Figs. 6 and 7, so that the rack-bars 3 cannot be raised. Therefore both sides of the window are securely locked. When the crank-arm $c'$ is turned back so that the pin enters the opening $e'$ the apertures $a$ are both in alignment with the pins $b$, as shown in Figs. 8 and 9, and therefore the rack-bar on each side can be raised and both sides of the window opened. When the pin is in the opening $e$ it will be observed that only in one side is the aperture $a$ in alignment with the pin $b$, as shown in Fig. 11, while on the opposite side, as shown in Fig. 10, the pin will abut against the periphery of the locking-bar and the passenger will be unable to open it. The reverse is true when the pin is in the opening $d'$. It will therefore be observed that the side of the window which may be open will be entirely controlled by the operation of the crank-arm $c'$ in turning the locking-roller A.

Having described our invention, what we claim, and desire to secure by Letters Patent, is—

1. The combination with a swinging sash window and a rack-bar adapted to operate said window, of a locking device comprising a perforated locking roller and means for rotating it, a pin secured to each rack-bar and adapted to engage with the perforations in said roller, as set forth.

2. The combination with a swinging sash window and a rack-bar adapted to operate said window, of a locking device comprising a perforated locking roller and means for rotating it, a pin secured to each rack-bar and adapted to engage with the periphery of said roller for the purposes of locking the sash.

3. The herein described locking roller perforated and suitably mounted and provided with a perforated collar at one end and a crank-arm having a pin adapted to yieldingly engage with the perforation in said collar, as set forth.

4. The herein described locking roller perforated and suitably mounted and provided with a perforated collar at one end and a crank-arm having a pin adapted to engage with the perforations in said collar and a spring mounted on said roller for the purpose of drawing the pin into engagement with the opening in the collar.

5. The combination with the vertically operated rack-bar having pins secured thereto and a swinging sash, of a locking roller perforated transversely, and means for operating it and means for forcing said pins into engagement with said locking roller, as set forth.

In witness whereof we have hereunto set our hands on this 23d day of September, 1895.

LEONARD G. ABBOTT.
JOSEPH P. MOODY.

In presence of—
C. W. SMITH,
HOWARD P. DENISON.